United States Patent Office 2,916,414
Patented Dec. 8, 1959

2,916,414

UREA-HEXACHLOROCYCLOHEXANE INSECTICIDE

Bernhard Raecke and Josef Drevers, Dusseldorf, Germany, assignors to Henkel & Cie. G.m.b.H., Dusseldorf-Holthausen, Germany, a corporation of Germany No Drawing. Application August 22, 1956
Serial No. 605,484

Claims priority, application Germany August 2, 1951

6 Claims. (Cl. 167—22)

This invention relates to, and has as its object, a urea-hexachlorocyclohexane adduct and is a continuation-in-part of our copending application, Serial No. 301,604, filed July 29, 1952, now abandoned.

In accordance with the invention, it has been found that if molten urea is mixed with molten hexachlorocyclohexane, a dry mass is formed upon solidification which may be very easily pulverized and which readily dissolves in water forming a very fine dispersion which constitutes an excellent insecticide.

The product formed by the admixture of the molten urea and the molten hexachlorocyclohexane is referred to herein and in the claims as a urea-hexachlorocyclohexane adduct, though the same is not believed to be similar in nature or structure to an inclusion compound formed from the urea and an aliphatic hydrocarbon and it is not certain whether the same constitutes a molecular compound or a mere admixture.

The adduct may be obtained from 1 to 10 and preferably 2 to 3 parts by weight of urea per part by weight of hexachlorocyclohexane.

The adduct is merely formed by heating the components, i.e., the urea and the hexachlorocyclohexane to temperatures above their melting points, intimately mixing the same together and allowing the mixture to cool below the solidification point.

As a result of the cooling and solidification, there is obtained a dry crumbly mass which may be very easily pulverized.

In order to form the insecticide, the mass is dissolved in water in amounts of from 1 to 50 and preferably 5 to 25 grams per liter.

While the hexachlorocyclohexane is normally insoluble and immiscible with the water and it is very difficult to form a dispersion of this material in the water, the adduct very readily forms a fine dispersion with no difficulty and without the necessity for any emulsifying equipment or the like. While the dispersion is relatively stable, after a prolonged period of time, the same will tend to settle out of the water unless a surface active agent is used. With the use of such a surface active agent, a completely stable dispersion may be formed. Any of the conventional or well-known surface active agents may be used for this purpose. Amounts of surface active agent from about 1 to 10 and preferably 3 to 5 weight percent based on the adduct may be used.

In the formation of the adduct, in place of pure hexachlorocyclohexane the same may be used in admixture with dissolving or diluting agents as, for example, decahydronaphthaline, cyclohexanol dibutyl ether, dodecyl alcohol, oleyl alcohol and cyclohexanone.

Amounts of 10 to 100 and preferably 50 to 60 percent by weight of the dissolving or diluting agents may be used based on the hexachlorocyclohexane.

The surface active agents may be directly added to the molten urea, molten hexachlorocyclohexane or the molten mixture so that the same will be incorporated in the adduct and a stable aqueous dispersion may be formed directly therefrom. The stability of the dispersion may further be improved by the addition of protective colloids such as polyacrylates, cellulose glycolates, etc.

The aqueous dispersions may be used for combating insect pests by direct spraying and preferably by spraying or coating surfaces therewith.

The adducts may be very conveniently packaged and sold in dry form and may be conveniently used by the purchaser by merely adding the same to the required amount of water and shaking.

The following examples are given by way of illustration and not limitation:

*Example 1*

8 parts by weight of urea are melted and 3 parts by weight of molten hexachlorocyclohexane are added. After cooling there is obtained a dry, crumbly mass which can easily be pulverized. When this mass is dissolved in water, there is produced a very fine dispersion which can be used for the combatting of insect pests, particularly by the spraying or coating of surfaces therewith. If the aqeuous solution stands for a long time, the hexachlorocyclohexane gradually settles to the bottom. The stability of the dispersion is improved if a part of the hexachlorocyclohexane is replaced by a wetting or dispersing agent. Thus, for instance, products prepared from 7 parts by weight urea, and 1.5 parts by weight of the polyglycol ether of a secondary alcohol having about 15 carbon atoms have been found useful. The quantity ratio of hexachlorocyclohexane to polyglycol ether can also be varied and, for example, adducts of 7 parts by weight urea, 2 parts by weight hexachlorocyclohexane and 1 part by weight polyglycol ether may be used.

*Example 2*

The hexachlorocyclohexane, as mentioned in Example 1, can also be used together with dissolving or diluting agents. A urea addition compound produced by stirring 14 parts by weight of molten urea with 3 parts by weight decahydronaphthaline and 3 parts by weight hexachlorocyclohexane, melting and letting the mixture cool while stirring gives a powder which, upon being placed in water, gives a hexachlorocyclohexane dispersion. Similar results are obtained if the decahydronaphthaline is replaced by the same quantity of cyclohexanol, dibutyl ether, dodecyl alcohol, oleyl alcohol and cyclohexanone. These products can also be mixed or used together with the customary wetting and dispersing agents.

*Example 3*

In the manner described, there is prepared from 21 parts by weight molten urea, 3 parts by weight hexachlorocyclohexane, 3 parts by weight technical oleyl alcohol and 3 parts by weight of a polyglycol ether of a secondary alcohol having about 15 carbon atoms, a mixture of addition compounds. The solid reaction product gives fine aqueous dispersions which are more stable than those obtained without wetting agents. By the addition of slimy substances such as, for instance polyacrylates, cellulose glycolates, etc., the stability of the products can be improved.

While the invention has been described in detail with reference to certain specific embodiments, various changes and modifications will become apparent to the skilled artisan which fall within the spirit of the invention and the scope of the appended claims.

We claim:

1. An adduct of urea and hexachlorocyclohexane.
2. An adduct of urea and hexachlorocyclohexane containing a surface active agent.

3. An insecticide comprising an aqueous dispersion of an adduct of urea and hexachlorocyclohexane.

4. An insecticide comprising an aqueous medium containing a surface active agent and a dispersion of an adduct of urea and hexachlorocyclohexane.

5. Process for the production of aqueous dispersion of hexachlorocyclohexane which comprises intimately mixing molten hexachlorocyclohexane and molten urea, cooling the mixture to form a solid material and dispersing the solid material in water.

6. Process according to claim 5 in which said dispersing is effected in the presence of a surface active material.

References Cited in the file of this patent

UNITED STATES PATENTS

| | | |
|---|---|---|
| 2,423,556 | Feibelmann | July 8, 1947 |
| 2,665,256 | Barker | Jan. 5, 1954 |

FOREIGN PATENTS

| | | |
|---|---|---|
| 592,670 | Great Britain | Sept. 25, 1947 |

OTHER REFERENCES

Chem. Abs. 34, 8061 (2), 8060 (9); 35, 1572 (3); 38, 1941 (3); 37, 2453 (8); 40, 4843 (1).

Frear: Chem. of the Insect., Fung., and Herb., 1948, 2nd ed., D. Van Nostrand, pp. 80–83.

King: "Chem. Evaluated as Insecticides," etc., Agr. Handbook No. 69, Dept. of Agr., May 1954, pp. 84, 127 and 334.